United States Patent Office 2,811,461
Patented Oct. 29, 1957

2,811,461

CELLULOSE ORGANIC ACID ESTER PLASTICS CONTAINING RESORCINOL MONO-META-HYDROXYBENZOATE

Lester W. A. Meyer and Margaret H. Broyles, Kingsport, Tenn., assignors to Eastman Kodak Company, Rochester, N. Y., a corporation of New Jersey No Drawing. Application April 14, 1954,
Serial No. 423,238

3 Claims. (Cl. 106—180).

This invention relates to cellulose organic acid ester plastics, and more particularly to the stabilization of such plastics.

As is well known in the art, plastics having excellent properties for a great many purposes can be prepared from cellulose organic acid esters, such, for example, as cellulose acetate, cellulose propionate, cellulose butyrate, cellulose acetate-propionate and cellulose acetate-butyrate, with suitable plasticizers. Many examples of suitable plasticizers are shown in the art. The choice of plasticizers forms no part of our invention.

However, cellulose organic acid ester plastics have not been entirely suitable for use in places where they are exposed to a considerable amount of ultraviolet light: e. g., out of doors. After one or two months of outdoor exposure in a sunny climate, the plastic bleached and became increasingly brittle until, at the end of from three to six months, depending on the severity of the climate, crazing occurred. The rapid deterioration of appearance was accompanied by an equally rapid breakdown in physical properties, such as strength.

Some compounds whose addition to the plastic composition inhibited physical breakdown of the plastic, caused intense discoloration when the plastic was exposed for any length of time to sunlight or other source of ultraviolet light.

We have found that the addition of a small proportion of resorcinol mono-m-hydroxybenzoate

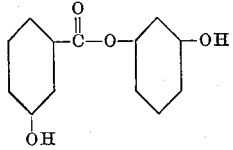

to a cellulose organic acid ester plastic composition strongly inhibits breakdown of the resulting plastic by exposure to ultraviolet light. We prefer to use approximately 0.5% to 5.0% of resorcinol mono-m-hydroxybenzoate, based on the weight of cellulose organic acid ester. Higher amounts give only slightly greater weathering resistance, and may change the physical properties of the plastic. As cellulose organic acid esters, we have employed those mentioned above, in which the acyl groups contain from 2 to 4 carbon atoms. Cellulose acetate plastics are not as effective for outdoor uses as are the mixed and higher esters, that is, those containing an acyl group higher than acetyl, because the usual cellulose acetate plasticizer retention is rather poor under outdoor exposure.

Resorcinol mono-m-hydroxybenzoate was prepared as follows: 69 grams (0.5 mole) of m-hydroxybenzoic acid, 110 grams (1 mole) of resorcinol, and 500 ml. of xylene were placed in a 2-liter, 3-necked flask fitted with an agitator and a reflux condenser, and heated. When refluxing began, 76 g. (0.5 mole) of phosphorus oxychloride (POCl$_3$) was dropped in, and refluxing was continued for 2 hours. The reaction mixture was cooled overnight, and the xylene layer was decanted and neutralized with sodium carbonate solution followed by two water washes. The low boilers were removed by warming the xylene layer on the steam cone under reduced pressure. The residue was distilled under vacuum at 130–177° C. at 0.1 mm. Subsequent runs showed the best solvent for the reaction to be 4:1 benzene-xylene mixture. The following analyses were made of a representative sample: calculated percent OH, 13.80, theoretical percent OH, 14.7, calculated percent C, 67.39, theoretical percent C, 67.82, calculated percent H, 4.63, theoretical percent H, 4.34, percent acid, 0.29.

In testing our cellulose organic acid ester plastics containing resorcinol mono-m-hydroxybenzoate, we have tested sheets of 0.050" thickness by the Kline test, designated as A. S. T. M. D795–49. The method consists of the following test cycle:

18 hours under General Electric S–1 sunlamp (6 inches below lamp)
2 hours in fog chamber
2 hours under S–1 sunlamp
2 hours in fog chamber This cycle was repeated until the first sign of surface failure of the samples of plastic, as shown by dulling, chalking, checking, crazing, warping, or discoloration. The temperature inside the accelerated weathering machine is maintained at 55° to 60° C.

It has been found by the National Bureau of Standards and verified by us, that roughly 200 hours' sunlamp exposure by this test is equivalent to one year's outdoor exposure in Washington, D. C. Outdoor exposure farther south or at high altitude is more severe, however.

The following table shows the values obtained by weathering similar samples of plasticized cellulose acetate-butyrate plastics of the same compositions, containing (a) no ultraviolet inhibitor, (b) 1%, based on the cellulose ester, of the well-known ultraviolet inhibitor, phenyl salicylate, and (c) 1%, based on the cellulose ester, of resorcinol mono-m-hydroxybenzoate.

| Inhibitor | Hours to Failure | Color of Plastic | |
|---|---|---|---|
| | | Start of Test | End of Test |
| None | 200–250 | | |
| Phenyl salicylate | 600 | 4 | 6 |
| Resorcinol mono-m-hydroxybenzoate | 1,480 | 8 | 10 |

The numbers in the "color of plastic" column indicate the relative intensity of coloration of the samples.

At the end of 1480 hours, the sample containing the resorcinol mono-m-hydroxybenzoate showed very slight, fine crazing of the surface.

Resorcinol mono-m-hydroxybenzoate is advantageously introduced into a cellulose organic acid ester plastic at the time the cellulose ester is compounded with the plasticizer. This compounding may be accomplished by any of the known methods, including the method of working on hot rolls described in Conklin's U. S. Patent 2,155,303. Resorcinol mono-m-hydroxybenzoate causes no substantial discoloration of the plastic, even when the hot-rolling method of compounding is employed, and no substantial discoloration takes place during accelerated testing.

By way of application, we give the following example of making up cellulose organic acid ester plastics containing resorcinol mono-m-hydroxybenzoate. It will be understood that this illustration does not constitute a limitation of our invention, which is defined in the appended claims.

Example.—100 parts of cellulose acetate-butyrate containing approximately 12% acetyl and 37% butyryl is intimately mixed in a sigma-blade mixer with 13 parts of dibutyl sebacate and 1 part of resorcinol mono-m-hydroxybenzoate. The mixture is worked on hot rolls by the method described in the Conklin Patent 2,155,303. The resulting plastic can then be granulated and be ready for any molding or extrusion operation.

Any of the known plasticizers for cellulose organic acid esters, such, for example, as dibutyl phthalate, dibutyl sebacate, methoxyethyl stearate, tricresyl phosphate, butoxyethyl phthalate, diamyl phthalate, ethyl p-toluene sulfonamide, etc., may be used. In the case of the softer cellulose esters, such as cellulose acetate-butyrate, plastics may even be formed without the use of any plasticizer.

What we claim as our invention and desire to be secured by Letters Patent of the United States is:

1. A cellulose organic acid ester plastic comprising a cellulose organic acid ester selected from the group consisting of cellulose acetate, cellulose propionate, cellulose butyrate, cellulose acetate-propionate and cellulose acetate-butyrate, a plasticizer therefor, and, as an agent for inhibiting deterioration of the plastic by ultraviolet light, approximately 0.5% to 5%, based on the weight of the cellulose ester, of resorcinol mono-m-hydroxybenzoate.

2. A cellulose acetate-butyrate plastic comprising cellulose acetate-butyrate, a plasticizer therefor, and, as an agent for inhibiting deterioration of the plastic by ultraviolet light, approximately 0.5% to 5%, based on the weight of the cellulose acetate-butyrate, of resorcinol mono-m-hydroxybenzoate.

3. A cellulose acetate-butyrate plastic comprising cellulose acetate-butyrate and, as an agent for inhibiting deterioration of the plastic by ultraviolet light, approximately 0.5% to 5%, based on the weight of the cellulose acetate-butyrate, of resorcinol mono-m-hydroxybenzoate.

References Cited in the file of this patent

UNITED STATES PATENTS

| | | |
|---|---|---|
| 2,264,291 | Boyer et al. | Dec. 2, 1941 |
| 2,389,370 | Koch | Nov. 20, 1945 |
| 2,407,209 | Swan | Sept. 3, 1946 |
| 2,432,517 | Dreyfus | Dec. 16, 1947 |
| 2,454,950 | Simpson et al. | Nov. 30, 1948 |
| 2,592,311 | Meyer et al. | Apr. 8, 1952 |
| 2,868,812 | Wynn et al. | Aug. 17, 1954 |

FOREIGN PATENTS

| | | |
|---|---|---|
| 492,558 | Great Britain | Sept. 22, 1938 |